United States Patent [19]
Li

[11] Patent Number: 5,582,173
[45] Date of Patent: Dec. 10, 1996

[54] SYSTEM AND METHOD FOR 3-D MEDICAL IMAGING USING 2-D SCAN DATA

[75] Inventor: Ming Li, Seattle, Wash.

[73] Assignee: Siemens Medical Systems, Inc., Iselin, N.J.

[21] Appl. No.: 529,778

[22] Filed: Sep. 18, 1995

[51] Int. Cl.$^6$ .................................................. A61B 8/00
[52] U.S. Cl. ................................. 128/660.07; 128/916
[58] Field of Search ........................ 128/660.06, 660.07, 128/660.08, 660.09, 660.10, 661.01, 661.10, 916, 660.04; 73/620, 625

[56] References Cited

U.S. PATENT DOCUMENTS

| 5,390,674 | 2/1995 | Robinson et al. | 128/660.07 |
| 5,479,926 | 1/1996 | Ustuner et al. | 128/660.04 |

OTHER PUBLICATIONS

"Deviations from Rayleigh Statistics in Ultrasonic Speckle," T. A. Tuthill, R. H. Sperry and K. J. Parker, Ultrasonic Imaging, vol. 10, pp. 81–89, Academic Press, 1988.

"Measurment of the Complete (3D) Velocity Vector of Blood Flows," O. Bonnefous, Proceedings of the 1988 Ultrasonics Symposium, pp. 795–799.

"Angle independent ultrasonic blood flow detection by frame–to–frame correlation of B–mode images,"G. E. Trahley, S. M. Hubbard and O. T. von Ramm, Ultrasonics 1988, vol. 26, pp. 271–276, Sep. 1988.

"Determination of Tissue Motion Velocity by Correlation Interpolation of Pulsed Ultrasonic Echo Signals," P. G. M. de Jong, et al., Ultrasonic Imaging, vol. 12, pp. 84–98, Academic Press, 1990.

"Flow Velocity Profile via Time–Domain Correlation Error Analysis and Computer Simulation," Steven G. Foster, et al., IEEE Transactions on Ultrasonics, Ferroelectrics, and Frequency Control, vol. 37, No. 2, May 1990.

"A Novel Method for Angle Independent Ultrasonic Imaging of Blood Flow and Tissue Motion," Laurence N. Bohs and Gregg E. Trahey, IEEE Transactions on Biomedical Engineering, vol. 38, No. 3, Mar. 1991.

"The van Cittert–Zernicke theorem in pulse echo measurments," Raoul Mallart and Mathias Fink, J. Acoust. Soc. Am. 90 (5), pp. 2718–2722, Nov. 1991.

"Experimental Evaluation of the Correlation interpolation Technique to Measure Regional Tissue Velocity," P. G. M. de Jong, et al., Ultrasonic Imaging, vol. 13, pp. 145–161, Academic Press, 1991.

"Three–Dimensional Reconstruction of Kidney from Ultrasonic Images," Yung–Nien Sun, et al., Proceedings of the IEEE Workshop on Biomedical Image Analysis, pp. 43–49, 1994.

"3D Displacement Field Reconstruction from Planar Tagged Cardiac MR Images," Thomas S. Denny, Jr. and Jerry L. Prince, Proceedings of the IEEE Workshop on Biomedical Analysis, pp. 51–60, 1994.

(List continued on next page.)

Primary Examiner—George Manuel
Attorney, Agent, or Firm—Jeffrey Slusher

[57] ABSTRACT

A region of tissue is scanned as a series of 2-D frames. The correlation of substantially homogeneous speckle regions in the frames is determined and is compared with a precalibrated speckle correlation-versus-distance function to give an estimate of the distance between the frames. In some applications, the frames are partitioned into sub-frames, whose correlation values and distances are combined according to predetermined functions to give a distance estimate between the frames as a whole. The reliability of the distance estimates is improved and evaluated in various ways, for example, by comparing combinations of possible distances from end frames via intermediate frames, and by comparing computed frame or sub-frame velocities with a known or estimated transducer velocity. Once the relative distances of the 2-D frames are estimated, a 3-D image is compiled using registration techniques. Image frames need not be parallel.

16 Claims, 5 Drawing Sheets

OTHER PUBLICATIONS

"A Recursive Filter for Temporal Analysis of Cardiac Motion," John C. McEachen, et al., Proceedings of the IEEE Workshop on Biomedical Image Analysis, pp. 124–133, 1994.

"Matching 3-D Anatomical Surfaces with Non-Rigid Deformations using Octree-Splines," Richard Szeliski and Stéphane Lavallée, Proceedings of the IEEE Workshop on Biomedical Image Analysis, pp. 144–153, 1994.

"Application of Stereo Techniques to Angiography: Qualitative and Quantitative Approaches," Jean Hsu, et al., Proceedings of the IEEE Workshop on Biomedical Image, pp. 277–286, 1994.

SYSTEM AND METHOD FOR 3-D MEDICAL IMAGING USING 2-D SCAN DATA

BACKGROUND OF THE INVENTION

1. Field of the Invention

This invention involves a system and a method for generating three-dimensional (3-D) images of structures from two-dimensional (2-D) images obtained through scanning, in particular, from 2-D images scanned using ultrasound.

2. Description of the Related Art

Imaging of a portion of a patient's body typically involves sensing the strength of one or more signals that have passed through (for example, X-ray), been reflected back from (for example, ultrasound) or been generated within (for example, positron-based imaging) a region of a body. In the context of medical ultrasonic imaging, signals are sensed most strongly from portions of the region where the local change in acoustic impedance is greatest. The relative strengths of the return signals are then converted and processed and displayed in some form, for example, on a monitor, that represents an image of the scanned region.

Existing imaging systems using, for example, ultrasound and positron-based technologies such as Positron Emission Tomography (PET) and Single Positron Emission Computerized Tomography (SPECT), generate images of the body that represent scan planes, that is, 2-D "slices" of the scanned region. These systems display each slice as it is generated so that the user "sees" the 2-D image corresponding to the current position and orientation of the transducer.

One big drawback of such purely 2-D imaging is that most of the imaged structures appear only as cross sections: the user gets no clear image of structures that do not extend in the plane of the "slice" currently being displayed. For example, if an artery is perpendicular to the scan plane, then all the user will be able to see is a small, circular region, and she will not be able to see even sharp "bends" in the artery.

One would think that a solution to this problem would be to simply compile a large number of 2-D image frames, register them in some way, and then display images in any plane of the registered compilation. The problem with this is that, in order to make proper registration possible, one must have accurate information about the distance between adjacent frames. This problem is made worse by the fact that the user normally does not move the transducer at a constant speed, even assuming she moves it in a constant direction; the user may, for example, spend more time "looking" at a particularly interesting portion of the scanned region and move quickly past other portions. Furthermore, different users will normally not move the transducer at the same speed.

One known way of dealing with this problem is to mount the transducer in a motorized bracket arrangement and then move it at a constant speed using the motors. This has several disadvantages: It's expensive; it's bulky; it requires a separate procedure for 3-D scanning than is used for 2-D scanning; and it eliminates much of the user's ability to directly control the scan, especially when using the hand-held transducers commonly used in ultrasonic imaging.

Another way to solve this problem is to mount mechanical (for example, wheels), inertial (accelerometers), magnetic (for example, Polhemus devices) or other types of position sensors on the transducer itself, so that one gets distance information along with the scan information. The drawback of this solution, however, is that such sensors add weight and complexity to the transducers, which makes it difficult to provide them in low-cost machines. Moreover, metallic objects in the examination area can create noise that disturbs magnetic position sensors, and almost every object between the sensor and the transducer will interfere with line-of-sight infrared or ultrasound sensors.

Another known way of creating 3-D images is to use multiple transducers that simultaneously image the same regions from two or more perspectives. The "stereo" imaging data is then processed using known algorithms into a 3-D data set. This solution, however, has an obvious disadvantage: multiple transducers lead to multiplied costs and complexity.

In "Measurement of the Complete (3D) Velocity Vector of Blood Flows," Proceedings of the 1988 Ultrasonics Symposium, pp. 795–99, Bonnefous describes using the distribution of a series of successive scatterers in the scanned region and certain correlation techniques to construct a 3-D model of blood flow. This method presupposes, however, that the scanned region comprises a flowing medium with a given velocity distribution.

What is needed is a system and associated method for generating 3-D images using a single transducer. Three-dimensional imaging should also be possible with little or no change to the flexible and familiar user-directed scan procedures, even for hand-held transducers, and it should be possible to create 3-D representations even of non-moving tissue.

SUMMARY OF THE INVENTION

According to the invention, a region of tissue is scanned by a transducer. A calibrated speckle correlation-versus-distance function is first pre-determined for the transducer, for the tissue to be scanned. Using the transducer and conventional reception circuitry, a series of 2-D image frames is generated, each frame being divided into image elements. Image elements representing speckle are first identified and then, for each scanned image frame, actual speckle correlation with at least one other frame is estimated, based on at least the image elements in corresponding portions of the respective frames. The distance between pairs of image frames is then estimated by evaluating the correlation-versus-distance function with the corresponding estimated actual speckle correlation for the pairs of frames. In order to provide proper 3-D registration of all the frames, a reference (frame, plane, or point) is chosen and the distance between the reference and least one other image frame is determined. The relative displacement from the reference of each frame for which correlation has been estimated is then determined, by evaluating the correlation-versus-distance function with the estimated actual speckle correlation. The different frames are then registered and displayed in a three-dimensional format as a 3-D representation.

In order to help avoid including non-speckle regions of frames in the speckle correlation calculations, each scanned image frame is preferably divided into a pattern of the sub-frames, each sub-frame comprising a pre-determined sub-set of the image elements in the scanned image frame and corresponding to one sub-frame in at least one other scanned image frame. Certain ones of the sub-frames in each scanned image frame are then identified as speckle sub-frames. The actual speckle correlation between pairs of scanned image frames is then determined as a predetermined function of actual speckle correlation between corresponding pairs of speckle sub-frames in the pairs of scanned image frames. In other words, rather than calculating a correlation value based on entire frame pairs all at once, the frames are first subdivided into sub-frames, correlation and separation is determined for corresponding pairs of sub-frames, and the correlation value and relative distance for whole frames is set as a function of the sub-frame correlation values.

As an additional feature, the invention includes various alternative ways of excluding from the speckle correlation calculations those portions of image frames that are not homogeneous, speckle portions. In one alternative, sub-frame distance between the predetermined pairs of scanned image frames is calculated as a predetermined function of the sub-frame correlation values of the image frames whose correlation values exceed a predetermined minimum correlation reliability value. In other words, if a sub-frame pair has a correlation that is below a threshold, then it is not used in the calculation of relative frame distance.

One alternative to this procedure is to estimate a sub-frame speckle probability, defined as the probability that the sub-frame represents a speckle region of the tissue. For each corresponding pair of sub-frames in predetermined pairs of scanned image frames, a sub-frame correlation value is then computed, as well as a weight for each sub-frame correlation value, which is a predetermined function of the speckle probability for the corresponding sub-frame. The distance between the frames is then determined by forming a weighted average of the sub-frame correlation values and evaluating the correlation-versus-distance function using the weighted average. According to yet another structure-rejection step, the weights for the sub-frame correlation values are computed as a predetermined function of the distance of each speckle sub-frame from a focal region of the transducer.

The invention extends the idea of verification further in yet another alternative embodiment. First, pairs of image frames are selected such that there is at least one other frame between them. Two frames are thus end frames, with at least one intermediate frame. There is then a plurality of "paths" that lead from one end frame to the other: for example, directly from the one end frame to the other, or from the one end frame to the adjacent intermediate frame, and from there to the other end frame, and so on. Each path represents a combination of frames, and between each pair of frames in a combination a corresponding distance is estimated using the calibrated speckle correlation-versus-distance function. The distance between the end frames is then estimated as a predetermined function of the different accumulated estimated distances for each of the paths.

Still another optional feature of the invention is reliability checking using estimated transducer velocity. First, a local transducer velocity is estimated over a plurality of image frames. A frame velocity is then calculated for each of selected ones of the scanned image frames, and each frame velocity is compared with the estimated local transducer velocity. Any frame whose frame velocity differs by more than a predetermined velocity threshold function value from the local transducer velocity is then marked as a spurious frame. The distance of the spurious frame from the reference may then be estimated not based on its correlation but rather using a rate (velocity) times time relationship.

In the embodiments in which frames are divided into sub-frames, the velocity of each sub-frame may similarly be estimated and compared with the velocities of other sub-frames. Any sub-frame whose apparent velocity deviates by more than a predetermined functional amount from that of the other sub-frames is either directly excluded from the distance determination of the frame as a whole, or is weighted so low that its contribution to the distance calculation of the whole frame is negligible.

The invention may be used to construct 3-D representations from 2-D scan data not only when all the image frames are parallel, but also when at least some of them have a rotational component relative to the reference. In these cases, angular displacement of adjacent non-parallel image frames is determined as a predetermined function of the distance estimates of corresponding sub-frames of the adjacent non-parallel image frames.

The invention also includes a processing system for determining the various correlation values, subdividing image frames (if this feature is included in the particular application), estimating distances, and compiling the 3-D image. A memory unit is also provided to store the various correlation values and functional parameters.

DETAILED DESCRIPTION

As is well known, when an object is scanned by some form of radiation, structures within the object that are too small to be resolved (roughly: smaller than the wavelength of the scanning radiation) may disperse, reflect, or otherwise interfere with the signal that is returned to the scanning device. When the device then creates an image based on the returned scan signal, this interference, which is noise, often makes the image less clear. For example, in medical ultrasonic imaging, the ultrasonic beam transmitted into the body is scattered by the microstructure of the tissue. This interference is known as "speckle." Speckle causes the image to appear granular, which in turn obscures smaller structures and masks the presence of low-contrast lesions. The problem is analogous to "snow" on a television screen, which reduces the "sharpness" of the TV image. The problem of speckle also appears—albeit usually to a lesser extent—in other imaging technologies such as Positron Emission Tomography (PET) and Single Positron Emission Computerized Tomography (SPECT).

In the area of ultrasonic imaging, speckle patterns are known to have certain statistical properties. In what is known as fully developed speckle from many random scatterers, speckle amplitude has a Rayleigh distribution. See, for example, "Deviations from Rayleigh Statistics in Ultrasound Speckle," T. A. Tuthill, R. H. Sperry and K. J. Parker, Ultrasonic Imaging, vol. 10, pp. 81–89, 1988.

Whereas speckle is commonly considered to be unwanted noise to be filtered out, the invention uses the speckle information to advantage to derive information about the distance that separates the several scanned planes of a 3-D interrogation volume. The invention may be used to generate 3-D images from 2-D scanned images obtained using any technology that encounters "speckle." The invention is described below in the context of medical ultrasonic imaging. This is the preferred embodiment of the invention since the speckle phenomenon is well understood for ultrasonic wavelengths, and since ultrasonic imaging systems usually use hand-held transducers and image often impatient patients in real time.

Figure 1:
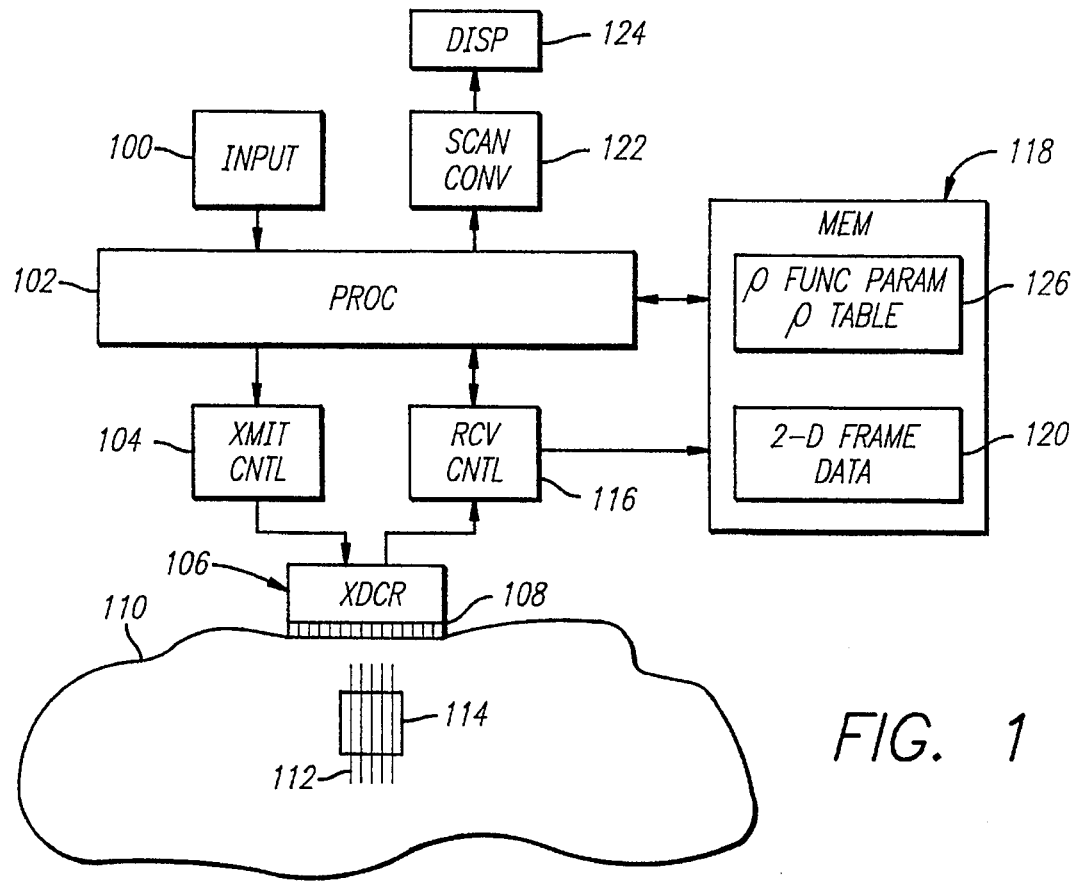
FIG. 1 is a block diagram that illustrates the main structural components of an ultrasonic imaging system according to the invention.

FIG. 1 illustrates the main components of an ultrasonic imaging system according to the invention. The user enters the various conventional scan parameters into an input unit 100, which typically includes such devices as a keyboard, knobs, and buttons. The input unit is connected to a processing system 102, which will typically be an electrically connected and cooperating group of processors such as microprocessors and digital signal processors; the processing system may, however, also be implemented by a single processor as long as it is fast enough to handle the various tasks described below.

As in known systems, the processing system 102 sets, adjusts, and monitors the operating parameters of a conventional transmission control circuit 104, which generates and applies electrical control and driving signals to an ultrasonic probe 106, which includes an array 108 of piezoelectric elements. As is well known in the art, the piezoelectric elements generate ultrasonic waves when electrical signals of the proper frequency are applied to them.

By placing the probe 106 against the body of a patient, these ultrasonic waves enter a portion 110 of the patient's body. By varying the phasing, amplitude, and timing of the driving signals, the ultrasonic waves are focused to form a series of scan lines 112 that typically fan out from the probe. Several such scan lines are shown extending into the patient's body in FIG. 1. A region of interest, that is, the region that the user wants to have an image of, is shown as an interrogation region or volume 114. The manner in which ultrasonic scanning signals are controlled, generated, and applied to a patient's body is well understood in the art and is therefore not described further. Of importance to the invention is that the interrogation volume 114 is scanned using a series of substantially adjacent scan planes (each comprising several scan lines) that extend over a known depth.

Ultrasonic echoes from the waves transmitted into the body return to the array 108. As is well understood, the piezoelectric elements in the array thereby convert the small mechanical vibrations of the echoes into corresponding electrical signals. Amplification and other conventional signal conditioning is then applied to the return signals by a reception controller 116. This processing includes, as needed, such known signal conditioning as time-gating, gain compensation, and diffraction compensation, in order to identify the echo signals that correspond to each scan plane of the interrogation volume 114.

The reception controller 116, all or part of which is normally integrated into the processing system 102, converts the ultrasonic, radio-frequency (RF) return signals (typically on the order of a few to tens of megahertz) into lower frequency ranges for processing, and may also include analog-to-digital conversion circuitry. This is well known in the art of ultrasonic imaging. The down-converted power values for the two-dimensional interrogation region are stored in a memory 118 as 2-D frame data 120, after conventional beamforming. Each set of frame data corresponds to one image frame, that is, to a 2-D cross section of the interrogation volume. Each frame of the image is represented and stored digitally as an array of acoustic power or intensity values for the image elements that make up the frame. As is explained in greater detail below, a series of 2-D frames—each corresponding to one image "slice"—is stored in the memory.

The interrogation region is normally not in the same shape as what the user wants to see displayed, and even when it is, the digital acoustic intensity values formed into beams are normally not in a form suitable for driving a conventional gray-tone or color display directly. The acoustic intensity values for an image frame are therefore applied to a conventional scan converter 122, which converts the digital acoustic values into display intensity or brightness values that are suitable for driving a display device 124. The display 124 is typically divided into a pattern of picture elements or "pixels" that make up an image that the user can view and interpret. Scan conversion and display are well-known features of an ultrasonic imaging system and are therefore not described further.

Figure 2:
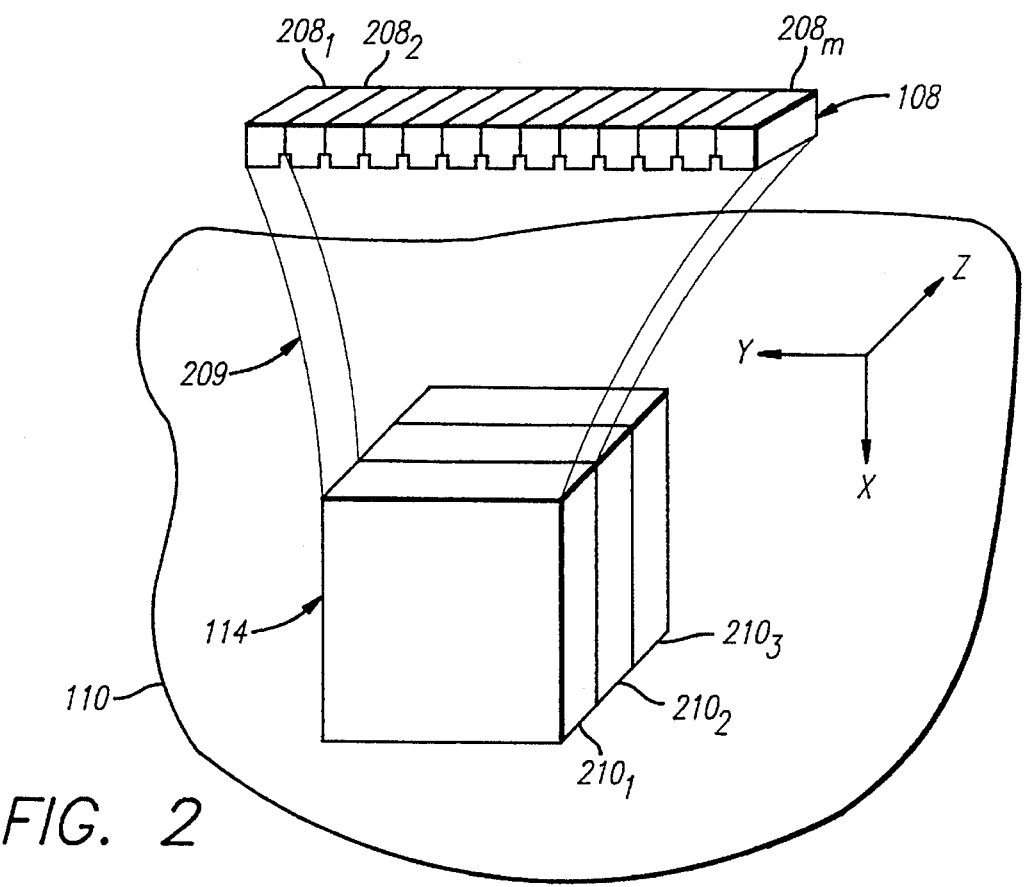
FIG. 2 illustrates the manner in which a piezoelectric array scans an interrogation region as a series of image frames.

FIG. 2 shows an orthogonal depth-lateral-elevation (X-Y-Z) coordinate system and illustrates the way in which an ultrasound transducer scans the interrogation region 114. When the elements $208_1, 208_2, \ldots, 208_m$ are arrayed in the lateral (Y) direction, they generate (with proper, conventional focusing) ultrasonic waves that form a transmit beam 209 in order to image portions of the body in the depth-lateral (X-Y) plane. Each portion is converted in the conventional manner into a corresponding image frame. In FIG. 2, three frames $210_1, 210_2, 210_3$ are shown that are adjacent in the elevation (Z) direction. FIG. 2 is greatly simplified for the sake of clarity: in actual scans, there will be many more than three adjacent frames and the frames need not be square. Moreover, as is explained below, the invention is also able to accommodate non-parallel frame planes, for example, such as would be generated when scanning by rotating or moving the transducer in an arc rather than just in the Z direction.

As is well known, each frame of an ultrasonic image is commonly resolved by the reception controller 116 or processing system into a 2-D pattern of image elements, each of which is represented and stored in the memory as a corresponding power value. In the simplest and most common case, images are generated, stored, and displayed using digital values corresponding to gray tones only. (The invention may also be used with color representations.)

Speckle is normally defined in terms of known statistical properties, and there are several known methods for identifying, and, in many cases, reducing speckle and of identifying what is assumed to be non-speckle, homogeneous tissue regions. Some methods, for example, identify as speckle any image element whose value differs by more than a predefined functional value of the average and standard deviation of the values of the elements in a region surrounding the element. According to the invention, any known method may be used to identify homogeneous tissue regions and image elements that are speckle within those regions.

Figure 3:
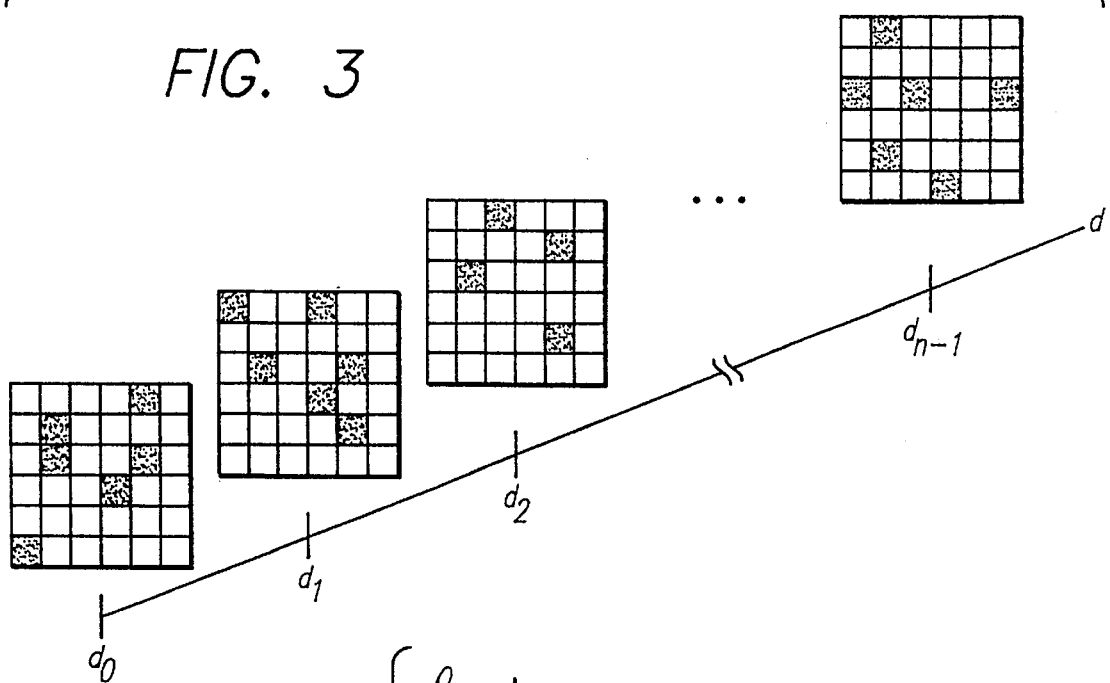
FIG. 3 illustrates a series of image frames with correlated speckle.

FIG. 3 illustrates a set of n adjacent image frames at distances $d_1, d_2, \ldots, d_{n-1}$ measured from a frame defined to be at a distance $d=0$ ($d_0$). The illustrated frames are greatly simplified in three main ways: 1) the frames are shown as being 6×6 (36 image elements); 2) the proportion of speckle elements in the illustrated frames is higher than is likely to occur in most actual scan frames; and 3) all speckle elements are assumed to be "dark," and all non-speckle, homogeneous tissue elements are assumed to be light. These assumptions are purely for the sake of easier explanation. The invention will work with any frame sizes and speckle proportions for which certain statistical properties of speckle hold (explained below), and for the full range of gray (or color intensity) tones.

In "The van Cittert-Zernicke theorem in pulse echo measurements," J. Acoust. Soc. Am. 90 (5), Nov. 1991, pp. 2718–2722, Raoul Mallart and Mathias Fink demonstrated that the van Cittert-Zernicke theorem—a classical theorem of statistical optics—also holds well for describing speckle in ultrasonic imaging and tissue characterization. Starting with the van Cittert-Zernicke theorem, Mallart and Fink showed that the spatial covariance (defined as correlation) of the pressure field of ultrasound at two points decreases with the distance between the points. They also showed that this relationship is independent of the frequency of the ultrasound. Furthermore, the spatial covariance is the same for continuous wave and pulsed ultrasound, and depends only on the transmitter aperture, assuming the same focus.

Stated more simply, this means that the speckle characteristics of two different image frames are more similar the closer together the frames are. FIG. 3 illustrates this: the pattern of speckle elements ("dark cells") is, for example, more similar between the frames at $d_0$ and $d_1$ than between the frames at $d_0$ and $d_2$. The similarity decreases with increasing distance.

Known methods such as that explained by Mallart and Fink use the van Cittert-Zernicke theorem as a way of improving the signal-to-noise ratio of the imaging, that is, of identifying and reducing the effect of speckle. These known methods begin with assumptions about distance and then use the theorem to derive information about the statistical properties of the scanned images. This invention turns this procedure "on its head," by determining statistical properties of adjacent image frames, and then using this information to determine distance between frames. Once the distances between 2-D frames are known, then a 3-D representation is built up.

The main steps of the method according to the invention are as follows:
1) pre-determine a calibrated speckle correlation-versus-distance function for the transducer to be used, for the type of tissue to be scanned, or both;
2) generate a series of adjacent 2-D image frames, divided into image elements, using conventional scanning and reception procedures;
3) identify image elements representing speckle, using any known method;
4) for each scanned image frame (or some selected sub-set of the frames), estimate its actual speckle correlation with at least one other frame, preferably using data redundancy to improve reliability;
5) for each frame for which correlation has been estimated, determine its distance from a reference frame or point by evaluating the correlation-versus-distance function using the estimated correlation;
6) register the different frames in 3-D and store the registered 3-D representation; and
7) display the 3-D representation under user control.

These steps are described below.

Precalibration of speckle correlation-versus-distance function

According to the invention, one first estimates the relationship between distance and speckle correlation. To do this, however, one must be able to generate a series of 2-D image frames (substantially parallel image "slices" of the 3-D interrogation volume) whose relative separation (from each other or from a reference point or frame) is known.

One way to do this is to calibrate each transducer using a test chamber that is made of or is filled with a material with known speckle properties. The design and use of such "phantoms" is well understood in the area of ultrasonic imaging, since phantoms are already used to calibrate transducers with respect to other factors such as depth accuracy and beam diffraction. The transducer to be calibrated is mounted in a bracket and is moved, often using precision motors, over a given distance, in good acoustic contact with the phantom. This calibration method is most precise with respect to the transducer itself, but it is carried out under substantially ideal conditions, which may not correspond well to what one gets when scanning actual tissue.

Speckle correlation (with a reference frame chosen arbitrarily, for example, the first one or the middle one) is calculated for each 2-D frame and the values of correlation are then stored in memory in a correlation table 126 (FIG. 1) linked to corresponding values for distance of the respective frames from the reference frame. (The distances are known precisely since the transducer's position is controlled precisely.) Different ways of calculating correlation are described below. For any given correlation value, one could then obtain the corresponding distance by matching it with the corresponding distance value. Alternatively, once the correlation values are tabulated, the parameters of an approximating function (for example, a Gaussian, exponential, polynomial, or trigonometric function) may be calculated using any known method. These parameters could then be stored and the function could be evaluated using a given correlation value as an argument in order to get an estimate of the corresponding distance; this usually saves storage space but at the cost of more processing time.

In order to calculate speckle correlation between different frames, one must of course first determine which of the many image elements in a frame are speckle. Speckle identification is discussed below.

Another way of obtaining 2-D calibration images covering the 3-D interrogation volume is for the user to make or lay a mark of known length along the scan path on the patient. For example, the operator could use a ruler to draw a line in ink on the skin of the patient along the scan path. Alternatively, the operator could simply lay a ruler on the patient's skin, as long as the ruler does not interfere with the operation of the transducer and its acoustic contact with the tissue. Such a line would typically be only on the order of a few centimeters long. The operator then does her best to scan the marked area repeatedly and at as constant a speed as possible, starting and ending at the endpoints of the line (or ruler markings). Several 2-D image sets are thereby created whose length in the elevation direction is known and whose frame spacing is roughly constant. Distances can be determined using known rate-and-time calculations. The correlation and distance values are then stored and the correlation values for assumed equal distances are averaged to form averaged, and in most cases, more accurate, correlation values. The averaged correlation values (or parameters of an approximating function) are then stored along with the distance values.

Correlation Calculations

The concept of correlation (of any dimension) is well understood and there are many different known methods to calculate a correlation value $\rho$. Assume that the image values for two different 2-D frames are $x_{i,j}$ and $y_{i,j}$, respectively. Note that the image frames do not need to be rectangular in order to represent them as a set of values with two indices. A correlation factor or value $\rho_{cc}$ between the two frames can then be determined in a conventional manner in the processor 102 according to the following well-known formula for cross correlation:

$$\rho_{cc} = \frac{\sum_{i,j} (x_{i,j} - \bar{x}) \cdot (y_{i,j} - \bar{y})}{\sqrt{\sum_{i,j}(x_{i,j}-\bar{x})^2} \sqrt{\sum_{i,j}(y_{i,j}-\bar{y})^2}}$$

where $\bar{x}$ and $\bar{y}$ are the arithmetic average values of all the $x_{i,j}$ and $y_{i,j}$, respectively.

In order to speed calculation, for example, by eliminating the need to calculate square roots, one could instead calculate the correlation factor using a different norm. For example, a correlation factor or value $\rho_{MSAD}$ based on the mean sum absolute difference (MSAD) value can be used:

$$\rho_{MSAD} = \sum_{i,j} |(x_{i,j}-\bar{x}) - (y_{i,j}-\bar{y})|$$

Normal experimentation, taking into account, for example, image resolution and the speed of the chosen processor 102, can be used to determine which formula one should best use to determine the correlation factor.

Figure 4:
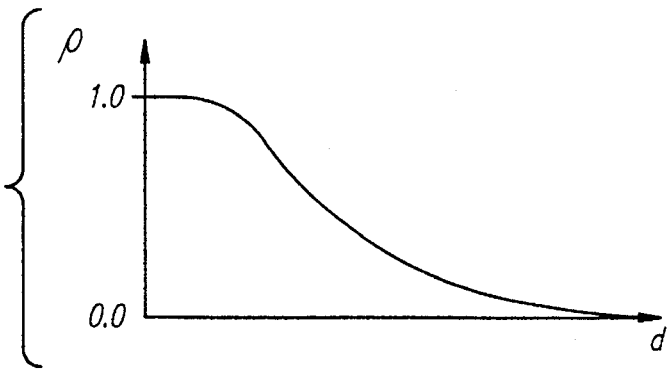
FIG. 4 illustrates a speckle correlation-versus-distance relationship.

The correlation and distance values (or the parameters of a functional approximation of them) will then represent a correlation-versus-distance function that is illustrated in FIG. 4. FIG. 4 also illustrates the van Cittert-Zernicke theorem: the correlation $\rho$ decreases with increasing distance d between the two frames used to determine correlation. For reasons of computational efficiency and predictability (for example, for scaling) and for meaningful comparison of different correlation values, it is preferred (although not necessary for successful use of the invention) that the correlation value be normalized. Standard normalization, that is, such that $|\rho|_{max} \leq 1.0$ is best for these purposes. Note that the cross-correlation value $\rho = \rho_{cc}$ is "automatically" normalized in this way. The MSAD correlation value $\rho_{MSAD}$, however, (and others that one may choose) are not automatically normalized; known normalization techniques should in such cases be applied to these values.

Actual Scanning

Once the correlation table is established for the given transducer or imaging session, the user scans an interrogation volume in the patient in any conventional manner. Although not necessary, for the sake of computational efficiency, speed, and accuracy, it is preferred that the user should move the transducer all or at least mostly in the elevation direction Z (see FIG. 2).

It is not certain that the user will want to have 3-D imaging capability each time she scans an interrogation volume. For example, she may not want to record a 3-D representation of the volume until she has located a region of interest using normal 2-D scanning. A switch such as a simple push button is therefore preferably provided on the transducer housing, in a foot switch, or elsewhere on the input unit 100 that is connected to the processor 102. As long as the user is activating the switch, the processor is in a 3-D mode, for which it stores 2-D frames for conversion to 3-D; otherwise, the processor may remain in a normal 2-D scan mode. Alternatively, the processor could continually generate and store 2-D frame sets for 3-D conversion, but carries out and enables display of the conversion of the stored frame data only upon activation of the switch.

Speckle Identification

The invention determines distance between frames based on speckle correlation. Once 2-D image frames have been scanned in and stored, any of several known methods may be used to determine which portions of the frames correspond to speckle regions. In order to obtain the most accurate estimate of the relationship between speckle correlation and distance, only speckle regions should ideally be compared; deviation from this ideal will not destroy the usefulness of the invention, but it will in most cases reduce the fidelity of the 3-D representation of the interrogation volume.

Estimating Actual Speckle Correlation

Once the calibrated speckle correlation versus distance function is determined and stored in memory segment 126 as a table or list of function parameters, the operator scans the interrogation region in the normal manner. A series of 2-D data frames is then generated and stored, each representing a imaged "slice" of the region.

Figure 5:
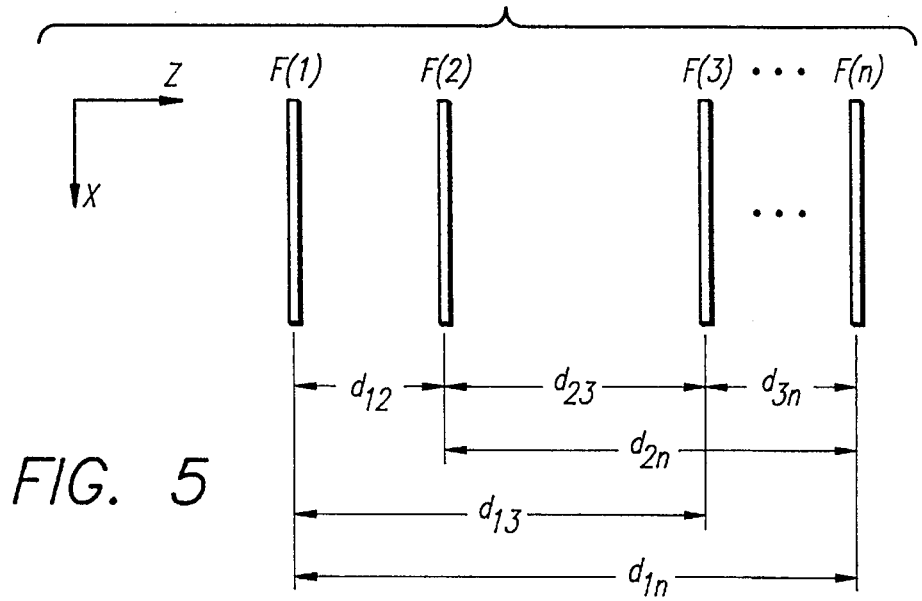
FIG. 5 illustrates a series of unevenly spaced apart image frames viewed in a lateral direction.

FIG. 5 illustrates n data frames $F(1), F(2), F(3), \ldots, F(n)$ as viewed from the "side," that is, in the Y or lateral direction. Frame F(k) is separated from frame F(m) in the elevational direction by the distance $d_{km}$; for example, frame F(1) is separated from frame F(2) by the distance $d_{12}$; frame F(2) is separated from frame F(3) by the distance $d_{23}$, and so on. Note that these distances are not known at the time of the scan; rather, the invention determines these distances as described below.

Figure 6:
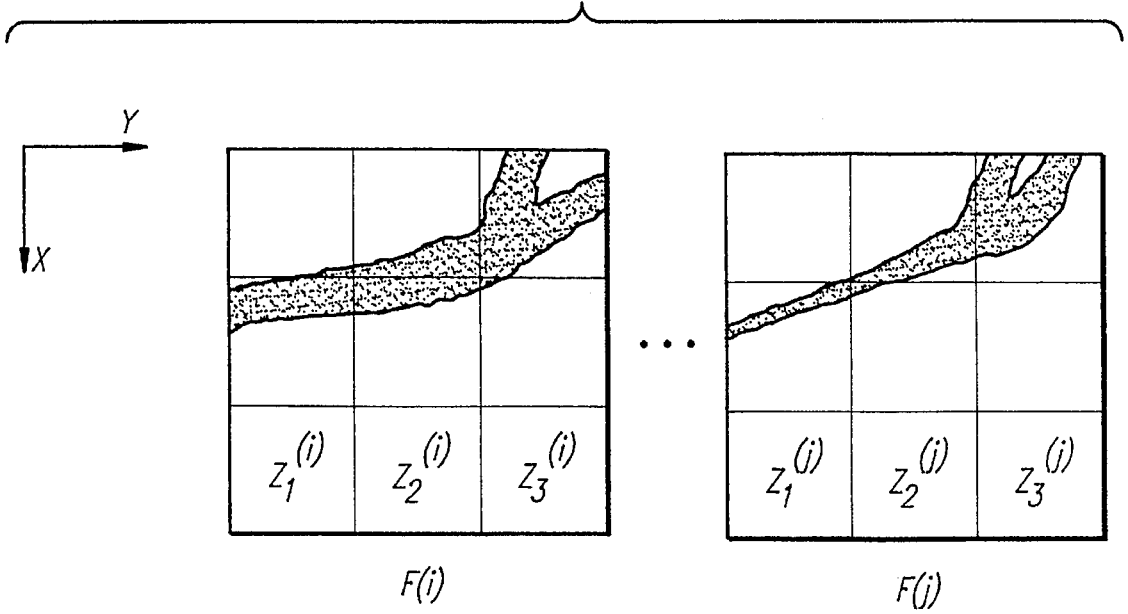
FIG. 6 illustrates two image frames that are divided into sub-frames and that each include related structure in addition to speckle.

FIG. 6 illustrates two image frames F(i) and F(j) viewed in the Z- or elevation direction. Each frame in FIG. 6 shows a region of structure; in FIG. 6, the example of structure is a cross-section of a blood vessel, which appears as a dark or shaded band that extends roughly in the Y-direction from the left edge of the images and branches near the upper right corner. The two different representations of the blood vessel are not shown as being identical, since they usually won't be during an actual scan—not only will the probe have moved, but the images are from different positions in at least the elevational direction. By way of example only and for the sake of simpler explanation, it is assumed that the rest of both image frames represents regions of homogeneous tissue, where image elements with values significantly different from adjacent elements are speckle.

It is possible according to the invention to calculate the speckle correlation to between F(i) and F(j) using all the data in both frames (the values of all the image elements). One drawback of this, however, is that regions of structure will be evaluated as if they were speckle, thereby introducing error. This error may often be unacceptably large, since the contributions to the correlation function may be large for elements at edges or boundaries of structural features.

It is therefore preferable according to the invention to divide each image frame into a number of sub-frames. (The "division" need not be displayed as visible dividing lines, but may, for example, consist of appropriate, well-understood indexing of the positions in the memory 118 (FIG. 1) for the corresponding frame data). In FIG. 6, each frame has been divided into nine sub-frames. This is by way of example only. The number of sub-frames to be used in any given application of the invention may be determined by conventional simulation and experimentation. Moreover, it is not necessary for sub-frames to be rectangular and of equal size, although this will normally be computationally most efficient. Correlation calculations such as those described above for $\rho_{cc}$ and $\rho_{MSAD}$ typically presuppose, however, that all frames are subdivided the same way.

The chosen speckle-identification routine is run on the frames and the processor 102 (FIG. 1) then identifies the sub-frames with the highest estimated ratio of speckle-to-structure over the frame set. In FIG. 6, these "speckle sub-frames" are the lower three sub-frames, labeled $z_1(i)$, $z_2(i)$, and $z_3(i)$ for F(i), and $z_1(j)$, $z_2(j)$, and $z_3(j)$ for F(j). Note that it is not necessary for the selected sub-frames to be adjacent to each other or in a line. Note also that the number of speckle sub-frames does not necessarily have to be predetermined and fixed at some value n, where the processor selects the n sub-frames with the highest speckle-to-structure ratio. Rather, for each 3-D image to be compiled, the processor could identify as speckle sub-frames all sub-frames whose speckle-to-structure ratio exceeds a predetermined threshold value.

Let $\rho(x,y)$ be the correlation between data sets x and y. The arguments x and y may, for example, be all the image elements for entire frames (x=F(i) and y=F(j)) or sub-frames (for example, $x=z_1(i)$ and $y=z_1(j)$).

In the preferred embodiment of the invention, the value of speckle correlation between two image frames is determined as a function of the speckle correlation values of all the corresponding pairs of speckle sub-frames. In FIG. 6, for example, the correlation for the lower left corner sub-frames $z_1(i)$ and $z_1(j)$ would be evaluated, then the lower center sub-frames, then the lower right corner sub-frames.

As is well known, the ultrasonic beam transmitted into the interrogation region has a given focus, at which depth each beam line has a minimum cross section; in some applications, the focus is adjustable, although this is not necessary according to the invention. The depth of focus is determined in any known manner for the transducer to be used for the scan. At depths less than or greater than that of the focal depth, the beam line is generally wider than it is in the focal region. The diffraction pattern is also determined in any known manner. (Note that focal and diffraction characteristics of a transducer are usually well-understood through experiment early in the design process for a transducer.) In order to minimize the distortion that such diffraction would cause, it is preferable to select sub-frame pairs that lie as close to the same depth, that is, in the same pre-determined focal region, as possible.

Preferably, a weighted average of the n sub-frame correlation values is chosen in order to simplify and thereby speed up calculations:

$$\rho(F(i),F(j)) = \frac{1}{n} \sum_{k=1}^{n} w(k) \cdot \rho(z_k(i), z_k(j))$$

where w(k) is the weight for sub-frame pair k.

Since there will in general be no reason to assume that any sub-frame's correlation value is more representative of the whole frame (assuming all sub-frames are speckle regions and in the same focal region) than any other, a simple arithmetic average is preferred to speed calculations even more. In other words, the values are unweighted, or, equivalently, w(k)=1 for all k. If sub-frames from different focal regions are compared, however, it is preferred to weight more highly the correlation values from sub-frames closest to the depth of focus, since these will be least affected by diffraction distortion; proper weighting to compensate for the diffraction effect can be determined by conventional experimentation and simulation.

As is mentioned above, most speckle-identification routines determine some measure of the likelihood that a given image element represents speckle. A composite speckle likelihood value for an entire multi-element region (for example, the average of the sum of speckle likelihood values for all image elements in a sub-frame) would then be calculated. The weights w(k) for the n sub-frames could then be set proportional to the likelihood values. Sub-frames most likely to be homogeneous speckle regions would thereby receive higher weights, according to any predetermined, tested function.

Furthermore, correlation values of 0.0 or 1.0 (or very close to these values) provide no useful quantitative distance information: $\rho=0.0$, for example, typically indicates only that two frames are "far apart"; $\rho=1.0$ tends to indicate that the frames are "very close" together and may actually be coincident, which may in turn indicate equipment malfunction or operator error. The weights for sub-frame pairs where $\rho\approx0.0$ or 1.0 should therefore be low or even zero.

The weights would preferably be normalized using conventional methods in order to maintain scaling and normalization of the correlation values. Although more complicated, such a method would not eliminate entire sub-frames from the correlation calculations; rather, all the sub-frames in the entire frame could be evaluated—the influence of sub-frames likely to represent structure will be reduced by their correspondingly lower weights. Conventional testing will determine whether weights are advantageous in any given application of the invention and, if they are, how the weights should be set.

The more of the actual speckle regions of the frames are included in the correlation calculations, the better the estimated speckle correlation will typically be. One way to increase the "coverage" of the speckle regions would be to have more but smaller sub-frames, in effect, increasing the "resolution" of the frame sub-division. This, however, also reduces the number of image elements in each sub-frame, which in turn reduces the degree to which the correlation value for the sub-frame is likely to approximate the correlation value for the speckle region of the frame as a whole. Conventional testing and simulation may be used to determine the best number and distribution of sub-frames for any given application of the invention.

Distance determination using estimated actual correlation

Figure 7:
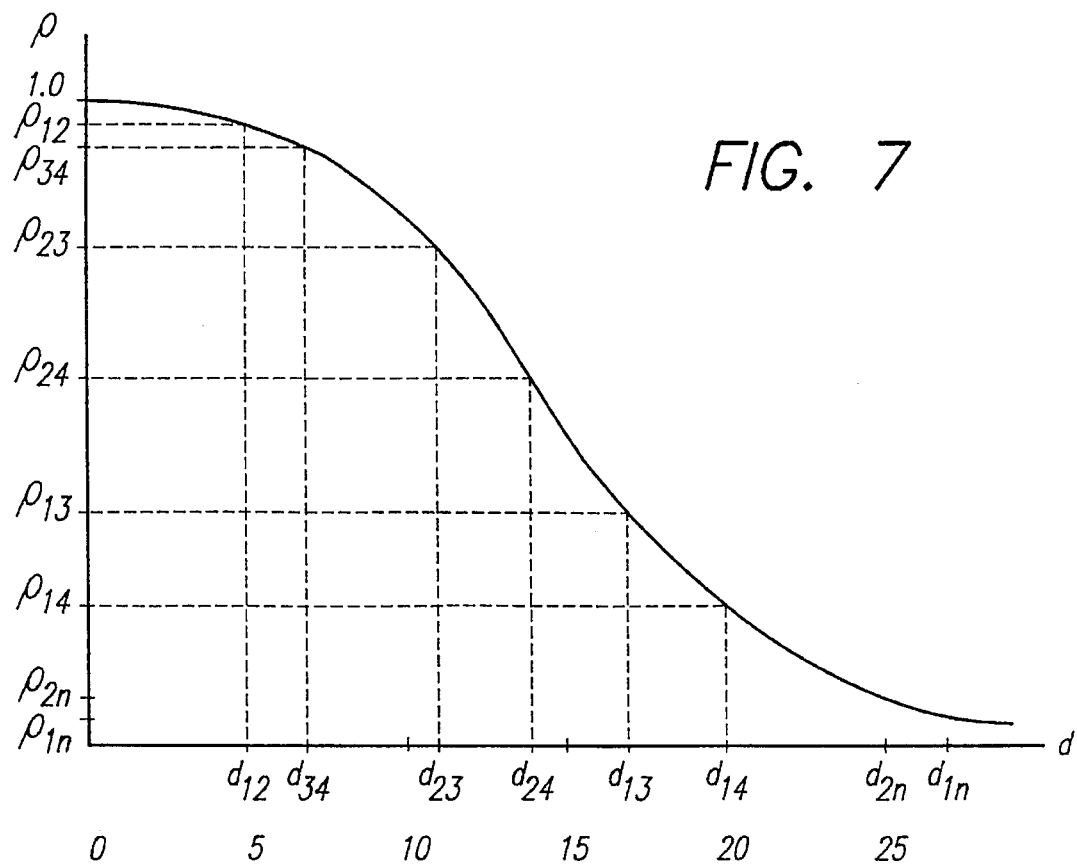
FIG. 7 illustrates the way in which relative distances are estimated based on measured speckle correlation.

Assume now by way of example that the correlation value between frames F(1) and F(2) is found to be $\rho(F(1), F(2)) = \rho_{12}$, that the correlation value between frames F(1) and F(3) is found to be $\rho(F(1), F(3)) = \rho_{13}$ and that the calibrated speckle-correlation-versus-distance function (stored in memory segment 126—see FIG. 1) is as illustrated in FIG. 7. The correlation values $\rho_{12}$ and $\rho_{13}$ are then seen to correspond to frame separations or distances of $d_{12}$ and $d_{13}$, respectively. Similarly, for each pair of frames F(i) and F(j) for which a correlation value $\rho_{ij}$ is determined, the calibrated speckle-correlation-versus-distance function yields a corresponding distance value $d_{ij}$.

One way to compile a 3-D image from the 2-D frames would then be to select one frame (for example, the center frame of the scanned series or one of the end frames) as a reference frame, to calculate correlation values only between the reference frame and all other frames, and then to determine the offset distance from the reference frame and all other frames. Assuming frame F(1) is chosen as the reference frame, the processor would then assign to frames F(2) and F(3) offsets of $d_{12}$ and $d_{13}$, respectively. The positions of each frame in 3-D would thereby be determined, and a 3-D image could be compiled. This method may be adequate in many applications of the invention.

One drawback of this straightforward method, however, is that it ignores much of the uncertainty associated with correlation calculations, especially at relatively large distances from the reference frame, and with the calibrated speckle-correlation-versus-distance function. Furthermore, different transducers, with different operating frequencies and geometries, will cause the accuracy of the respective calibrated speckle-correlation-versus-distance functions to differ.

If calculations were perfect, the distance from the reference frame F(1) to the third frame F(3) would be equal to the distance between F(1) and F(2) plus the distance between F(2) and F(3); in other words, $d_{13}$ would be equal to $d_{12}+d_{23}$. In actual applications, however, this will almost never be the case, since speckle by its very nature is not a perfectly deterministic phenomenon.

To address these uncertain factors, in the preferred embodiment of the invention, the estimated correlation values are used in a redundant manner to more accurately estimate relative distances. The preferred method is to assign to each image frame (other than the reference) the distance equal to a weighted sum (or average) of at least some of the theoretically "possible" distance combinations, which, for convenience, can be designated $D_{ij}(k)$ for each "nominal" distance $d_{ij}$.

For example, assuming perfect calculations, both of the following would be true for $d_{13}$.

$$d_{13} = \begin{cases} d_{13} & = D_{13}(1) \\ d_{12}+d_{23} & = D_{13}(2) \end{cases}$$

Similarly, for $d_{14}$ in FIG. 7, all of the following would be true:

$$d_{14} = \begin{cases} d_{14} & = D_{14}(1) \\ d_{13}+d_{34} & = D_{14}(2) \\ d_{12}+d_{24} & = D_{14}(3) \\ d_{12}+d_{23}+d_{34} & = D_{14}(4) \end{cases}$$

Correlation determinations are, however, not exact, so that, in practice, the various possible distances D are different: $D_{ij}(k) \neq D_{ij}(m)$ for $k \neq m$. According to the invention, the mean and standard deviation of the different possible distances D are computed (assuming there are at least three D values). Each distance $d_{ij}$ is then set to a weighted average of the possible distances, that is, $$d_{ij} = \sum_k w_k \cdot D_{ij}(k)$$

where the weights $w_k$, which are preferably normalized such that $\|w_k\|=1$, are chosen empirically using known methods as functions of such factors as the correlation values used to derive each D(k), the mean and standard deviation of the different D(k), and known transducer-dependent parameters such as those defining its depth of field. In order to eliminate the influence of potential statistical outliers, the weight for any value of D(k) more than, for example, one standard deviation away from the mean, may be set to zero.

Furthermore, when two frames are more than a certain distance $d_{max}$ apart, they become almost totally decorrelated, or at least so decorrelated that the correlation value does not indicate distance accurately enough for most applications of the invention. For any possible distance $D_{ij}(k)$ that is greater than $d_{max}$, its weight is preferably set to zero. Even simpler, the processor should preferably not even calculate any possible distance $D_{ij}(k)$ that would include any $d_{ij}>d_{max}$. Choosing a $d_{max}$ is equivalent to choosing a minimum threshold correlation value $\rho_{min}$, less than which distance values are assumed unreliable and are disregarded. The minimum threshold correlation value $\rho_{min}$, will be predetermined using conventional experimentation and simulation.

3-D image registration

Once a distance from a reference has been determined for all the 2-D frames, they can be compiled into a registered 3-D image representation using any conventional method, of which several are known.

3-D image display

Any conventional method may be used to generate the registered 3-D image display. In general, once a reference frame is chosen, a plane in a 3-D region can be specified using a three-parameter vector, as long as suitable conventions are chosen to represent planes perpendicular to reference axes. It is possible according to the invention to include an appropriate combination of input devices (mice, trackballs, slides, knobs, a keyboard, etc.) to generate the parameters needed to fully specify which plane is to be shown on the display 124. With proper selection of a reference origin (for example, at a corner or at the center of the imaged region) and a reference frame (for example, the X-Y-Z system described above), only three parameters need be specified to select an image plane for display. With three potentiometer slides, for example, the operator could select an arbitrary display vector. A vector (0, 1, 0), for example, would indicate a plane perpendicular to the Y-axis one display unit (of any conventional type) away from the X-Z plane. A vector (1, 1, 1) would pass through the three points that are one display unit out on each axis, which plane would intersect the (0, 1, 0) plane at a 45-degree angle. As one of many alternatives, the operator could use slides or knobs to control angles of rotation of the display plane in the reference system rather than its position.

Other well-known 3-D display techniques may be used as alternatives. These include the techniques known as volume or surface rendering. If such techniques are used then appropriate control devices (such as keyboards, trackballs, pointers and mice) will be included in the input unit or the display unit.

Non-linear probe motion

Figure 8:
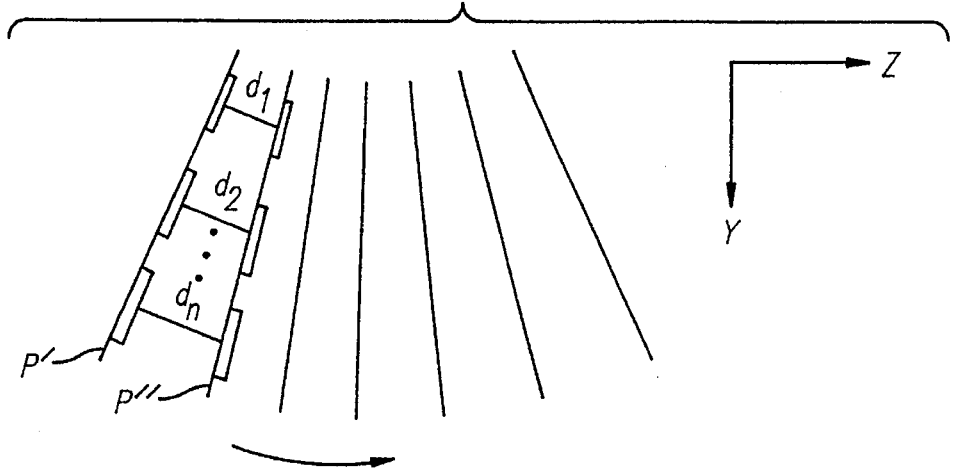
FIGS. 8–10 illustrate various non-linear scan patterns that can be used with the invention.
Figure 9:
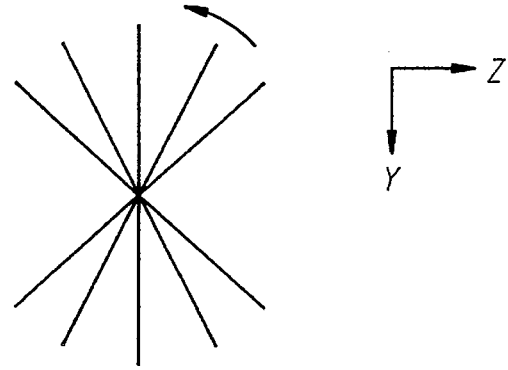
Figure 10:
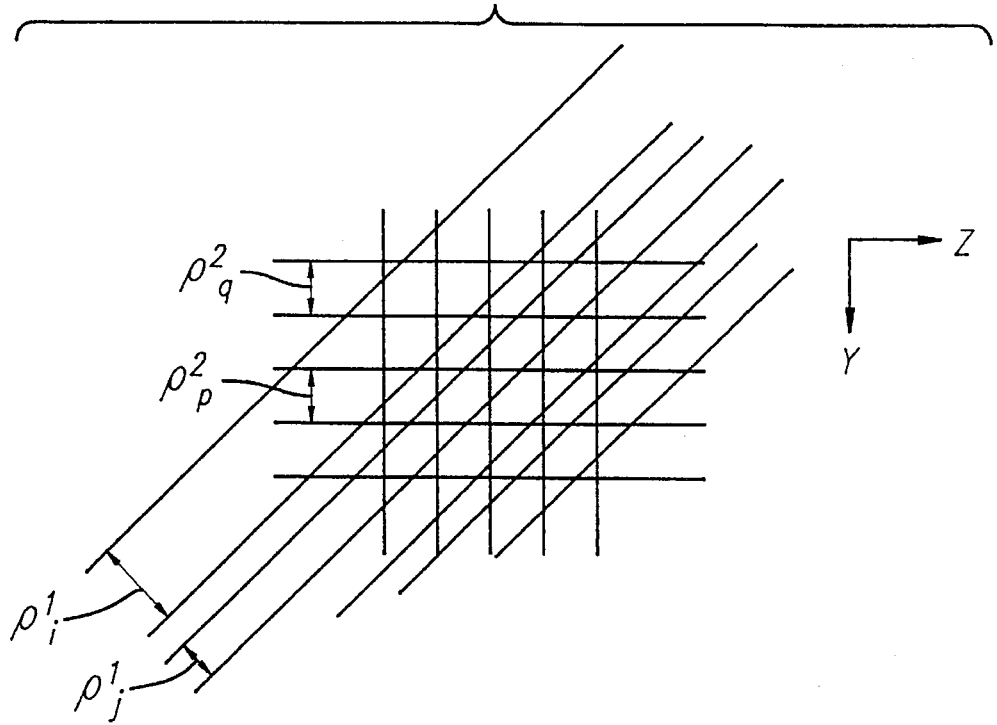

The invention is not limited to compilation of a 3-D image based on motion, that is, translation, of the probe in the elevation direction alone. In other words, the invention may also be used to generate 3-D images when the interrogation region is scanned by moving the probe in a "fan" pattern (with image planes as in FIG. 8 and probe motion along the arrow), in a rotational pattern (FIG. 9), in a combined pattern of two or more separate linear scans (FIG. 10), or in any other pattern for which 3-D registration is practical. As FIG. 10 illustrates, it is not necessary for multiple scan directions to be orthogonal, or to have uniform frame separation, even within a single scan. Non-linear scanning may be appropriate, for example, for such non-planar surfaces of the patient's body as breasts and the head.

Various methods may be used to provide 3-D registration for probe motion with a component in more than one direction, or using more than one scan of the same region. For example, conventional feature-identification techniques (such as edge-detection) may be used to define the boundaries of features in different frames. By considering multiple imaging zones in the depth direction, one may then apply a conventional least-squares estimation technique with the relative frame distances as variables to obtain the set of distances that best match the features in the different frames to the identified structures in the least-squares sense.

In FIG. 10, correlation values $\rho^1_i$ and $\rho^1_j$ are shown between two pairs of frames in a "diagonal" scan (that is, with probe motion other than in the Y or Z directions), and correlation values $\rho^2_p$ and $\rho^2_q$ are shown for a Y-direction scan. Each correlation value will correspond to an estimated distance. If one assigns relative distances between the various frames of a scan, then one has also determined a 3-D representation of the region. For any given assignment of distances, each scan will yield a different estimated 3-D representation. All the scans are, however, of the same region, so one must then determine how to "place" the various frames so that the difference between the different 3-D representations is at a minimum. "Difference" between representations may be defined in any conventional manner, for example, using the measures of correlation described above. Known minimization routines (such as gradient-based searching) may then be applied to determine the "best" set of distances and thus the best 3-D representation. Note that this type of 3-D registration does not necessarily need to rely on a speckle correlation-versus-distance relationship, but even in such case, use of this relationship according to the invention would provide good initial distance values for the optimization routine and thus significantly reduce computation times.

Figure 11:
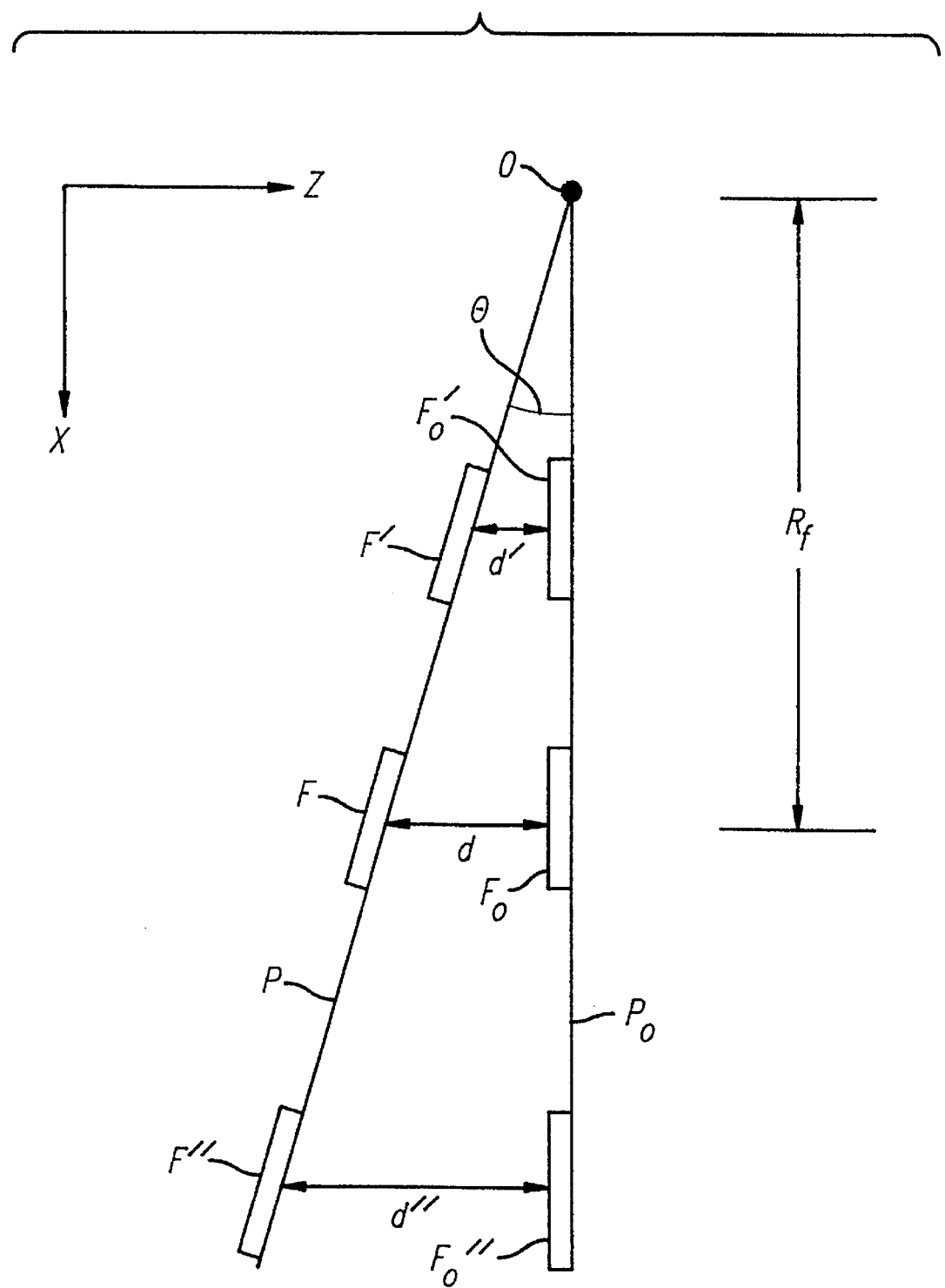
FIG. 11 illustrates two image frames of a non-linear scan and the way in which the invention determines angular displacement and velocity.

FIG. 11 illustrates an application in which a 3-D image is built up based on rotation of a probe about the Y-axis, that is, in which the probe is "rocked" back and forth along substantially the same line of contact or origin 0 with the patient's body. Three image sub-frames $F_0$, $F_0'$, and $F_0''$ are shown along a reference scan plane $P_0$, and three sub-frames for F, F', and F" are shown along a different scan plane P. Note that the scan planes do not have to be perpendicular to the X- or Z-axes, and that a scan will comprise many scan planes.

As is well know, for any given transducer there is a known focal distance $R_f$. According to the invention, the sub-frame F at this focal distance is identified through conventional time-gating techniques, and its correlation with the corresponding sub-frame $F_0$ on the reference plane is determined as above. This correlation yields, as before, a distance estimate d. In general, the angle $\theta$ between the scan planes P and $P_0$ will be small enough that the following relationship will hold:

$$\theta \approx \frac{d}{R_f}$$

Once the angle $\theta$ is determined, the position of the scan plane P is theoretically also fixed. Knowledge of the angle $\theta$ for each scan plane in the interrogation region also is sufficient to render the 3-D structure of the region using known techniques.

Similar angles $\theta'$ and $\theta''$, may, however, also be computed for the other sub-frames based on their respective estimated relative separations d' and d", where the corresponding depth values (corresponding to $R_f$) may be estimated using time-gating. Although the angles $\theta'$ and $\theta''$ should according to theory be the same as $\theta$, in practice they will normally differ, for example, because of the statistical uncertainties in the distance estimates. One may then use as the assumed angle a weighted average of the angle estimates. Alternatively, one may compare the estimated angles for sub-frames at arbitrary depths with the angle for the sub-frames at the focal depth and then discard as spurious sub-frames whose estimated angle differs by more than a reliability threshold value from the focal depth angle.

A similar angle-estimation technique can be applied to rotational probe motion, or combined rotation and translation, for which the origin is unknown. Refer once again to FIG. 8. To determine the angle between scan planes P' and P", one first estimates, based on speckle correlation, the distances d1, d2, . . . , dn, for corresponding pairs of image sub-frames. Correspondence is determined either by conventional time-gating, by known feature-identification routines, or some combination of such procedures. Time-gating also yields the relative depth separation of the frames. A least-squares (or other) linear approximating function can then be applied to determine the point of intersection of the two planes, which then also yields the angle between the planes, and thereby enough information to construct a 3-D image using known registration techniques.

The invention also provides for a verification procedure for the registration operation. Note that the frame rate, that is, the rate at which new frames are generated, is known. Using the speckle correlation-versus-distance relationship as described above, the distance between frames is also estimated. Multiplying the frame rate (for example, in frames per second) by the distance between frames (in any length unit) then gives an estimate of the probe velocity (in length units per second) between the frames. For probe motion that includes a rotational component, the velocity estimate will preferably be angular. For example, in FIG. 11, the scan plane and all frames will have rotated by $\theta$ during one frame period. The velocity estimate, or even just the speed estimate (which is non-directional), can be used in various advantageous ways.

Note that for most human users holding and using the ultrasonic probe, the velocity and speed of the probe will not change significantly during many frame periods. This means that the probe will move about the same distance during the same time period, such as during one frame period. This information is used according to the invention to increase the reliability of the distance estimations.

In FIG. 5, assume that the estimated probe speed is $v_{12}$, from frame F(1) to frame F(2), $v_{23}$ from frame F(2) to F(3), and, in general, $v_{ij}$ from frame F(i) to frame F(j). The probe speed can be estimated by dividing the estimated distance by the time (which is known) between generation of the respective frames. If the estimated speed to one particular frame differs by more than a threshold amount or percentage from the speeds to adjacent frames (for example, to the one, two, or three closest frames on either side), then the system can identify the estimated distance to the frame as spurious.

To come up with a threshold, the processor may, for example, determine the average frame velocity $\bar{v}$ (which represents an estimate of the local transducer velocity) and its standard deviation $\sigma_v$ over a predetermined number of frames either before or on either side of a current frame. The average frame velocity may be a weighted average. For example, one could give greater weight to velocity values for frames closer to the current frame. This would reflect the usually reasonable assumption that the transducer velocity is more nearly constant over a short time interval than it is over a long time interval. Of course, it is also possible to compute a simple arithmetic average velocity, which is simply a special case of weighting (with all weights set to unity).

A frame can then be identified as spurious if the distance based frame velocity for that frame falls outside of the range $\bar{v} \pm \sigma_v$. Instead of computing standard deviation to delimit the interval, one could instead require the current frame's estimated velocity to be within a certain percentage of the average velocity.

The processor may take any of several courses of action in the event a spurious frame is identified. For example, an interpolated distance can be assumed for the spurious frame. Alternatively, using an average of the probe velocity estimates (for example, $\bar{v}$) for frames on either side of the "suspicious" frame, the estimated distance for the frame can be set to the average velocity times the time between generation of the previous frame and the current, suspicious frame. Note that this is equivalent to estimating a probe acceleration profile over the series of frames and then rejecting as spurious or modifying any distance estimate that deviates more than a predetermined amount from the profile. Instead of, or in addition to replacing a "suspicious" distance estimate based on correlation calculations with a distance estimate based on velocity calculations, the system may give a warning (a light, a display indication, a beep, and so on) to the user that the scan may not be valid due to "jerking" and/or the suspicious frame may simply be excluded from 3-D registration.

Refer to FIG. 6. Since all the sub-frames lie in the same image plane, the velocity (linear or angular, or combined) of each sub-frame will be either the same, or at least proportional to the distance from some reference point or line, as that of the other sub-frames. According to the invention, therefore, the system calculates the distance estimate from each sub-frame in one frame to the corresponding sub-frame in the next frame. Based on the distance estimates and the known time between frames, velocity or speed estimates are then calculated. If a sub-frame pair's velocity estimate differs by more than a threshold amount or percentage from the velocity of other sub-frame pairs, then the system can identify the estimated distance to the frame as spurious. In such case, the corresponding distance estimate can be excluded from any calculation of possible distances D. Either another sub-frame pair can be evaluated, or the system can simply accept the distance estimate based on the remaining sub-frames.

Analogous evaluations can identify spurious distance estimates for frames in a "rotating" scan such as in FIG. 11. Moreover, by calculating the statistics (mean and standard deviation will typically suffice) of velocity estimates for the various frame or sub-frame pairs, the degree by which a particular velocity estimate deviates from the mean can be used to determine the weight that is assigned to the corresponding distance estimate, for example, in calculations of possible distances.

X-Y Plane Motion Correction

Refer to FIGS. 1 and 2. When a user operates an ultrasound probe, she moves it over the surface of a patient's body. Many of these surfaces (for example, the stomach area or breasts) are so soft or non-planar that it is practically impossible to hold the probe in the Y-Z plane. According to the invention, conventional techniques are preferably used to provide X-Y plane motion correction before any Z-direction calculations (such as correlation) are performed. In other words, one compensates for frame displacement parallel to the scan plane that is caused by transducer motion before the planar frames are registered in 3-D. One example, of a suitable class of correction techniques is block matching, such as MPEG.

I claim:

1. A method for generating a three-dimensional representation of a region of tissue scanned by a transducer, comprising the following steps:

A) pre-determining a calibrated speckle correlation-versus-distance function for the transducer to be used, for the tissue to be scanned, or both;

B) generating a series of 2-D image frames, divided into image elements;

C) identifying image elements representing speckle;

D) for each scanned image frame, estimating actual speckle correlation with at least one other frame based on at least the image elements in corresponding portions of the respective frames;

E) estimating the distance between pairs of image frames by evaluating the correlation-versus-distance function with the corresponding estimated actual speckle correlation for the pairs of frames, including estimating the distance between a reference and at least one other image frame;

F) for each frame for which correlation has been estimated, determining its relative displacement from the reference by evaluating the correlation-versus-distance function with the estimated actual speckle correlation;

G) registering the different frames in a three-dimensional format as a 3-D representation; and H) displaying the 3-D representation.

2. A method as defined in claim 1, further including the following steps:

dividing each scanned image frame into a pattern of the sub-frames, each sub-frame comprising a pre-determined sub-set of the image elements in the scanned image frame and corresponding to one sub-frame in at least one other scanned image frame;

identifying certain ones of the sub-frames in each scanned image frame as speckle sub-frames; and estimating the actual speckle correlation between pairs of scanned image frames as a predetermined function of actual speckle correlation between corresponding pairs of speckle sub-frames in the pairs of scanned image frames.

3. A method as defined in claim 2, further including following steps:

for each corresponding pair of sub-frames in predetermined pairs of scanned image frames, computing a sub-frame correlation value; and determining a sub-frame distance between the predetermined pairs of scanned image frames as a predetermined function of the sub-frame correlation values of the image frames whose correlation values exceed a predetermined minimum correlation reliability value.

4. A method as defined in claim 2, further including the following steps:

generating a plurality of the 2-D image frames to be non-parallel, the displacement of each such non-parallel frame from the reference thereby having a rotational component; and estimating angular displacement of adjacent non-parallel image frames as a predetermined function of the distance estimates of corresponding sub-frames of the adjacent non-parallel image frames.

5. A method as defined in claim 2, further including the following steps:

estimating a local transducer velocity over a plurality of image frames;

calculating a frame velocity for each of selected ones of the scanned image frames;

comparing each frame velocity with the estimated local transducer velocity; and marking as a spurious frame any frame whose frame velocity differs by more than a predetermined velocity threshold function value from the local transducer velocity.

6. A method as defined in claim 5, further including the following steps:

calculating a velocity-based distance value for each spurious frame, wherein the velocity-based distance value is defined as the product of the local transducer velocity and a predetermined time value; and for each spurious frame, setting its distance from the reference equal to a predetermined functional value of the corresponding velocity-based distance value.

7. A method as defined in claim 2, further including the following steps:

for each corresponding pair of sub-frames in predetermined pairs of scanned image frames, computing a sub-frame correlation value;

determining a sub-frame distance between the pairs of sub-frames by evaluating the correlation-versus-distance function with the sub-frame correlation values;

for each corresponding pair of speckle sub-frames in the pairs of scanned image frames, estimating a sub-frame transducer velocity value;

calculating a frame velocity;

comparing each sub-frame velocity with the frame velocity; and estimating the relative displacement of the frames as a predetermined function of the sub-frame distances for only those sub-frames whose sub-frame transducer velocity values differ by less than predetermined functional reliability value from the frame velocity.

8. A method as defined in claim 1, further including the following steps:

dividing each scanned image frame into a pattern of the sub-frames, each sub-frame comprising a pre-determined sub-set of the image elements in the scanned image frame and corresponding to one sub-frame in at least one other scanned image frame;

for each sub-frame of each scanned image frame, estimating a sub-frame speckle probability, defined as the probability that the sub-frame represents a speckle region of the tissue;

for each corresponding pair of sub-frames in predetermined pairs of scanned image frames, computing a sub-frame correlation value; and determining a distance between the predetermined pairs of scanned image frames as a predetermined function of the sub-frame correlation values of the image frames.

9. A method as defined in claim 8, further including the step of computing a weight for each sub-frame correlation value as a predetermined function of the speckle probability for the corresponding sub-frame; in which:

the step of determining the distance comprises forming a weighted average of the sub-frame correlation values and evaluating the correlation-versus-distance function using the weighted average.

10. A method as defined in claim 2, further including the following steps:

for each corresponding pair of sub-frames in predetermined pairs of scanned image frames, computing a sub-frame correlation value;

computing a weight for each sub-frame correlation value as a predetermined function of the distance of each speckle sub-frame from a focal region of the transducer; and determining the distance between the predetermined pairs of scanned image frames by forming a weighted average of the sub-frame correlation values and evaluating the correlation-versus-distance function using the weighted average.

11. A method as defined in claim 1, further including the following steps:

for selected pairs of image frames for which at least one intermediate image frame is located between them, designating the frames in the selected pairs as end frames;

selecting a plurality of combinations of the end frames and of the intermediate frames;

summing the estimated distances between all adjacent pairs of the end frames and the intermediate frames to form a possible total distance; and estimating the distance between the end frames as a predetermined function of the possible total distances for the selected plurality of combinations.

12. A method as defined in claim 1, further including the following steps:

estimating a local transducer velocity over a plurality of image frames;

calculating a frame velocity for each of selected ones of the scanned image frames;

comparing each frame velocity with the estimated local transducer velocity; and marking as a spurious frame any frame whose frame velocity differs by more than a predetermined velocity threshold function value from the local transducer velocity.

13. A method as defined in claim 12, further including the following steps:

calculating a velocity-based distance value for each spurious frame, wherein the velocity-based distance value is defined as the product of the local transducer velocity and a predetermined time value; and for each spurious frame, setting its distance from the reference equal to a predetermined functional value of the corresponding velocity-based distance value.

14. A method as defined in claim 1, further including the following steps:

generating the 2-D image frames as planes extending in a depth direction; and compensating the image frames for transducer motion in the depth direction before the step of registering the different frames in a three-dimensional format.

15. A method as defined in claim 1, further including the following steps:

carrying out steps A)–F) for a plurality of scans of the region, each scan extending in a different principal direction; and registering the frames of all scans into a single 3-D registration.

16. A system for generating a three-dimensional representation of a region of tissue including:

A) an ultrasonic transducer scanning the region as a series of 2-D image frames, each frame comprising a pattern of image elements;

B) processing means:
1) for identifying in each 2-D image frame image elements representing speckle;
2) for each scanned image frame, for estimating actual speckle correlation with at least one other frame based on at least the image elements in corresponding portions of the respective frames;
3) for estimating the distance between pairs of image frames by evaluating a predetermined calibrated correlation-versus-distance function with the corresponding estimated actual speckle correlation for the pairs of frames, including estimating the distance between a reference and at least one other image frame;
4) for each frame for which correlation has been estimated, for determining its relative displacement from the reference by evaluating the correlation-versus-distance function with the estimated actual speckle correlation; and
5) for registering the different frames in a three-dimensional format as a 3-D representation;

C) a memory including a 2-D frame data portion for storing the 2-D image frames and a correlation data portion for storing predetermined parameters of the correlation-versus-distance function; and D) a display means for displaying the 3-D representation.

* * * * *